United States Patent [19]

Berry et al.

[11] Patent Number: 4,921,271
[45] Date of Patent: May 1, 1990

[54] METHOD AND APPARATUS FOR ADJUSTING WHEEL ALIGNMENT IN A STEERABLE WHEEL SUSPENSION ASSEMBLY

[75] Inventors: Jimmy D. Berry; Robert M. Allman, both of Longmont, Colo.

[73] Assignee: Specialty Products, Inc., Longmont, Colo.

[21] Appl. No.: 314,824

[22] Filed: Feb. 23, 1989

[51] Int. Cl.⁵ .............................................. B62D 17/00
[52] U.S. Cl. ................................... 280/661; 29/401.1; 403/4; 403/96
[58] Field of Search .......................... 280/661, 96.1; 29/401.1; 403/4, 96, 93

[56] References Cited

U.S. PATENT DOCUMENTS

| | | | |
|---|---|---|---|
| 601,613 | 3/1898 | Castle | 403/96 |
| 1,057,928 | 4/1913 | Briggs | 403/4 |
| 1,140,020 | 5/1915 | Bradley | 403/96 |
| 1,548,238 | 8/1925 | Adams | 403/96 |
| 2,923,555 | 2/1960 | Kost et al. | 280/96.1 |
| 4,037,680 | 7/1977 | Grove | 280/661 |
| 4,252,338 | 2/1981 | Ingalls et al. | 280/661 |
| 4,400,007 | 8/1983 | Ingalls | 280/661 |
| 4,420,272 | 12/1983 | Ingalls et al. | 280/661 |
| 4,509,772 | 4/1985 | Drotar et al. | 280/661 |

OTHER PUBLICATIONS

"Alignment Tool and Part Catalogue 1988-1989", of Arn-Wood Co., Inc., 2360 W. Bates Ave., Englewood, Colo.
"Ingalls Truct & Auto Alignment", Catalogue No. 880 (1988 copyright notice), Ingalls Engineering Company, Inc., 9138 N. 95th, Longmont, Colo.
1986 Catalogue 31, Shim-A-Line, Inc., 7407 Wayzata Blvd., Minneapolis, Minn.
Shimco Products, Inc., Catalog—"How-to-Book—Products for Wheel Alignment".

*Primary Examiner*—Charles A. Marmor
*Assistant Examiner*—Karin Tyson
*Attorney, Agent, or Firm*—William P. O'Meara; Bruce G. Klaas

[57] ABSTRACT

A bushing assembly for adjusting at least one wheel alignment parameter for use in a vehicle wheel suspension system of the type having a suspension member with a bore therein adapted for mounting a ball-joint-shaft-receiving bushing and with at least one positioning surface located adjacent to the bore in the suspension member, including a bushing member with a generally cylindrical body portion and a radially extending head portion having a ball joint shaft receiving bore therethrough; an annular locking member having at least one recess in a bottom portion thereof for engaging the suspension member locating surface; and a post member insertable through axially extending peripheral bores in the locking member and the bushing head portion for adjustably locking the bushing member against rotation with respect to the locking member, the locking member being positioned between the bushing head portion and the suspension member.

14 Claims, 3 Drawing Sheets

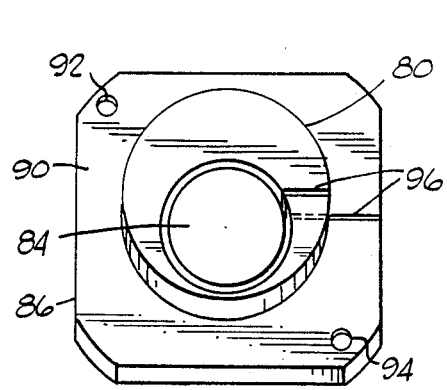
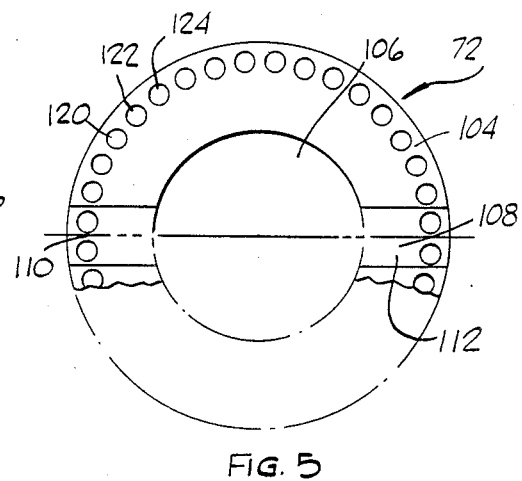
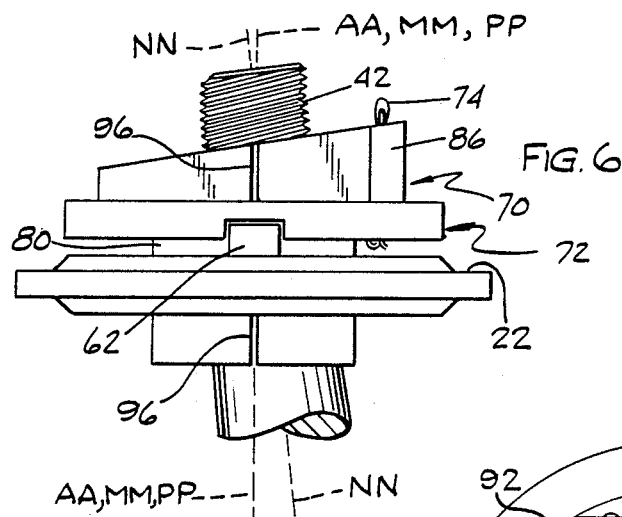
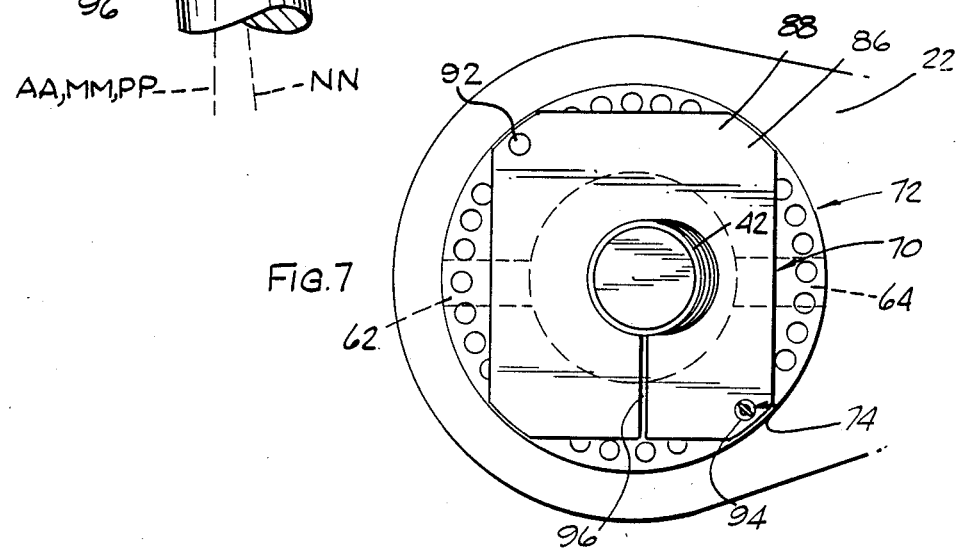

METHOD AND APPARATUS FOR ADJUSTING WHEEL ALIGNMENT IN A STEERABLE WHEEL SUSPENSION ASSEMBLY

BACKGROUND OF THE INVENTION

The present invention relates generally to method and apparatus for adjusting vehicle wheel alignment and, more particularly, to method and apparatus for adjusting caster and camber in a vehicle steerable wheel suspension assembly.

Many utility vehicles such as trucks and four-wheel-drive vehicles have a front wheel suspension assembly which includes a fixed axle housing which pivotally supports a wheel knuckle through a pair of ball joints. The wheel knuckle supports a wheel spindle which, in turn, rotatably supports a vehicle wheel assembly.

A number of devices have been provided for adjusting the camber and/or caster of wheels supported by such suspension assemblies. Such adjustment devices are generally of two types: (1) wheel shim-type adjustment devices, or (2) bushing-type adjustment devices.

Plate-type adjustment devices generally comprise a tapered shim member which is interposed between the steering knuckle and spindle. The amount of shim taper and the orientation of the shim determine the amount of camber adjustment provided. Grove, U.S. Pat. No. 4,037,680, issued July 26, 1977, which is hereby specifically incorporated by reference for all that is disclosed therein, describes such a camber adjusting shim.

Bushing-type camber and/or caster adjustment devices are described in Ingalls et al., U.S. Pat. No. 4,252,338, issued Feb. 24, 1981; Ingalls, U.S. Pat. No. 4,400,007, issued Aug. 23, 1983; Ingalls et al., U.S. Pat. No. 4,420,272, issued Dec. 13, 1983; and Drotar et al., U.S. Pat. No. 4,509,772, issued Apr. 9, 1985, all of which are hereby specifically incorporated by reference for all that is disclosed therein. In bushing-type camber adjustment devices, a camber and/or caster adjustment bushing is mounted in a bore portion of an axle housing. The bushing member has a generally cylindrical shape and has a bore extending therethrough which is adapted to accept the shaft portion of the ball joint therein. The bore which extends through the bushing is positioned in noncoaxial relationship with the central longitudinal axis of the bushing. Camber and/or caster adjustment are provided by relative rotation of the bushing within the associated bore in the axle housing. Due to the noncoaxial alignment of the bushing bore with the bushing central longitudinal axis, rotation of the bushing causes relative shifting displacement in the lower end of the ball joint which is mounted in the associated wheel knuckle. Relative forward and rear shifting movement of the ball joint lower end portion produces a change in the "caster" of an associated wheel. Relative lateral shifting movement of the ball joint lower end portion produces camber adjustment.

In certain vehicles manufactured by the Ford Motor Company, locating lugs are positioned adjacent to a bushing mounting bore in an axle housing. Camber adjustment bushings are provided which have peripheral cutouts in head portions thereof. These bushings are adapted to be installed in an associated axle housing bore with the cutout portions thereof engaged with the locating lugs. Such bushings are adapted to be positioned in a first orientation for providing a positive camber setting and a second, 180° rotated position for providing a negative camber setting. No incremental camber adjustments between these two positions may be provided. No caster adjustments are provided by such bushings. Generally, a plurality of such bushings are provided. A different camber adjustment is provided by each bushing, e.g. plus or minus $\frac{1}{4}$ degree, plus or minus $\frac{1}{2}$ degree, plus or minus $\frac{3}{4}$ degree, etc. In order to adjust camber using such bushings, it is necessary to first install the bushing in either a positive or a negative camber adjustment position. Next, the associated ball joint shaft is mounted in the bushing and the camber of the wheel is measured. If the camber is incorrect, it is necessary to remove the ball joint, remove the bushing, and select another bushing. The next bushing is then installed and the process is thus repeated until a bushing having the correct amount of camber adjustment has been selected.

A bushing assembly described in Ingalls, U.S. Pat. No. 4,400,007, includes a bushing member, annular lock ring, and snap ring which enable multiple camber and caster adjustments to be provided in a Ford-type suspension system as described above, without removal of the bushing member from the axle housing bore. However, a problem with this bushing assembly is that the surface portions of the bushing and lock ring members have relatively complex configurations which add significantly to production costs. Another problem with the bushing assembly of U.S. Pat. No. 4,400,007 is that only a limited number of alignment settings are provided.

SUMMARY OF THE INVENTION

The present invention is directed to a method and apparatus for adjusting at least one wheel alignment parameter in a steerable wheel suspension system.

The invention may comprise: a steerable wheel suspension assembly comprising: fixed axle housing means for pivotally supporting a wheel knuckle means therein; wheel knuckle means for supporting a wheel spindle thereon; first ball joint means for pivotally connecting said axle housing means with said wheel knuckle means; said ball joint means comprising a shaft portion mounted in said axle housing means and a ball housing portion mounted in said wheel knuckle means; bushing means having a central bushing axis and having a bushing bore extending therethrough having a central bore axis positioned in noncoaxial relationship with said central bushing axis; said bushing means being received in a bore in said axle housing means and being rotatable therein about said central bushing axis; said ball joint shaft portion being received in said bushing bore; bushing head means fixedly attached to said bushing means and projecting radially outwardly therefrom; annular plate means located between said bushing head means and said axle housing means and rotatably received about said bushing means for facilitating angular adjustment between said bushing means and said axle housing means; plate locking means for locking said plate means in angularly fixed relationship with said axle housing means; adjustable bushing locking means for locking said bushing means in a selected angular orientation with respect to said annular plate means.

The invention may also comprise a bushing assembly for adjusting at least one wheel alignment parameter for use in a vehicle wheel suspension system of the type having a suspension member with a bore therein having a central longitudinal axis and adapted for mounting a ball-joint-shaft-receiving bushing and with at least one positioning surface located adjacent to the bore in the suspension member, comprising: (a) a bushing member comprising: a generally cylindrical body portion adapted to be inserted into the suspension member bore; a head portion fixedly attached to one end of said body portion and extending radially outwardly therefrom and having axially extending post receiving head opening means therein for receiving a post means; a ball-joint-shaft-receiving bore extending through said body portion and said head portion and having a central bore axis positioned in noncoaxial relationship with said cylindrical body central longitudinal axis; (b) an annular locking member comprising: a first end surface adapted to be positioned adjacent to said bushing member head portion and a second end surface adapted to be positioned adjacent to the suspension member; a central bore extending therethrough adapted to receive said bushing member body portion therein; post receiving locking member opening means selectively axially alignable with said post receiving head opening means for receiving said post means; a positioning surface engaging means for engaging the positioning surface on the suspension member for preventing relative rotation of said annular locking member with respect to the suspension member bore; (c) post means insertable into said post receiving head opening means and said post receiving locking member opening means for preventing relative rotation between said bushing member and said locking member.

The invention may also comprise: a bushing assembly for adjusting at least one wheel alignment parameter for use in a vehicle wheel suspension system of the type having a suspension member with a bore therein adapted for mounting a ball-joint-shaft-receiving bushing, comprising: (a) a bushing member comprising: a generally cylindrical body portion adapted to be inserted into the suspension member bore; a head portion fixedly attached to one end of said body portion and extending radially outwardly therefrom and having first axially extending opening means therein for receiving a post means; a ball-joint-shaft-receiving bore extending through said body portion and said head portion and having a central bore axis positioned in noncoaxial relationship with said cylindrical body central longitudinal axis; (b) second axially extending opening means stationarily associated with said suspension member means and selectively axially alignable with said first opening means for receiving said post means; (c) post means axially insertable into said first and second opening means for preventing relative rotation between said bushing member and said suspension member.

The invention may also comprise a method of correcting a wheel alignment parameter in a vehicle wheel suspension system of the type having a first suspension member connected to a second suspension member by a ball joint and having a bore in the first suspension member adapted to receive a ball joint bushing assembly and having a positioning lug located adjacent to the bore comprising the steps of: (a) mounting an annular locking member on the first suspension member with a recessed axial end surface thereof in locking engagement with the positioning lug; (b) inserting a bushing member through a central opening in the locking member; (c) inserting the bushing member into the bore in the first suspension member; (d) inserting the shaft portion of a ball joint assembly through a bore in the bushing member; (e) rotating the bushing member within the bore in the first suspension member until an associated wheel assembly is located in a desired wheel alignment position; (f) axially inserting at least one pin through aligned bores in the locking member and bushing member so as to prevent relative rotation therebetween.

BRIEF DESCRIPTION OF THE DRAWINGS

An illustrative and presently preferred embodiment of the invention is shown in the accompanying drawings in which:

FIG. 4 is a bottom plan view of a bushing member of the bushing assembly of FIG. 3.

FIG. 5 is a bottom plan view of an annular plate member of the bushing assembly of FIG. 3.

FIG. 6 is a front elevation view of the bushing assembly of FIG. 3 installed in a suspension member.

FIG. 7 is a top plan view of the installed bushing assembly of FIG. 6.

DETAILED DESCRIPTION OF THE INVENTION

Prior Art Suspension Assembly

Figure 1:
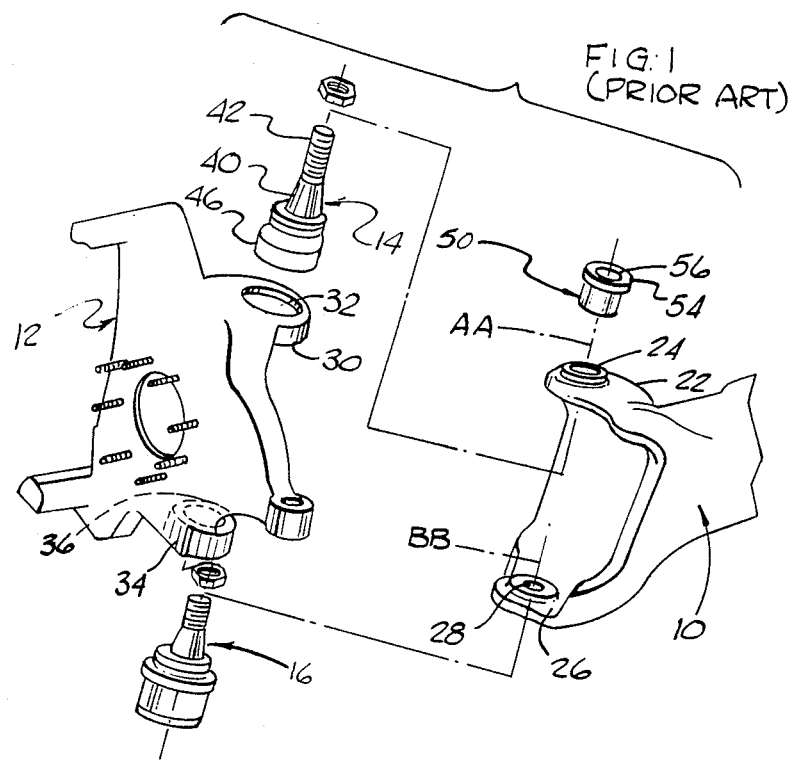
FIG. 1 is perspective view of a portion of a prior art front wheel suspension assembly.

FIG. 1 illustrates a portion of a prior art steerable front wheel suspension assembly. This suspension assembly includes a fixed axle housing 10 which is adapted to have a wheel knuckle 12 pivotally mounted thereon by means of a pair of ball joints 14, 16.

The fixed axle housing 10 comprises an upper yoke portion 22 having a cylindrical bore 24 therethrough. The bore 24 may comprise a generally vertically oriented central bore axis AA. The axle housing comprises a lower yoke portion 26 which has a cylindrical bore 28 extending therethrough which may have a central longitudinal axis BB extending parallel to upper bore axis AA.

The wheel knuckle 12 may comprise an upper portion 30 having a cylindrical bore 32 therein and a lower portion 34 having a cylindrical bore 36 therein. The bores 32, 36 may have parallel central longitudinal bore axes.

The ball joints 14, 16 may be identical in construction, each comprising a ball joint shaft 40 having a first, threaded end portion 42 which is adapted to receive a nut 43 thereon and having a second end portion 44 which terminates in a ball configuration The ball portion 44 is received in a ball joint housing 46 which is adapted to be fixedly mounted as by a press fit in an associated bore 32 or 34 of the wheel knuckle 12.

A bushing 50 is provided having an outer cylindrical surface 52 and having a radially projecting head portion 54. A bore 56 extends through the bushing and comprises a central longitudinal bore axis CC which may be positioned in either skewed or eccentric relationship with the central longitudinal axis DD of the cylindrical bushing. The bushing 50 is adapted to be positioned in close-fitting relationship with bore 24 of the axle housing. The bushing comprises peripheral cutouts 58, 60 in the head portion 54 thereof which are adapted to closely receive locating lugs 62, 64 provided on the upper surface of the axle housing adjacent to bore 24.

The lugs may project upwardly approximately ⅛ inch and may have a width of approximately ⅜ inch. The bushing 50 provides a fixed amount of positive camber adjustment or a fixed amount of negative camber adjustment depending upon the relative rotated position of the peripheral cutouts 58, 60, with respect to the locating lugs 62, 64.

Adjustable Bushing Assembly

Figure 2:
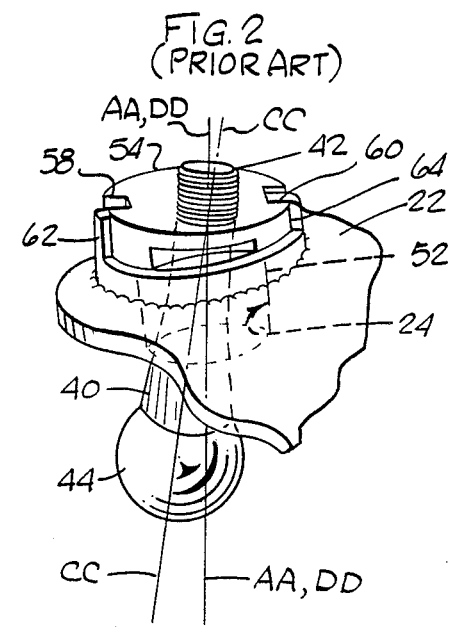
FIG. 2 is a detail perspective view of an installed bushing and ball joint of the suspension assembly of FIG. 1.
Figure 3:
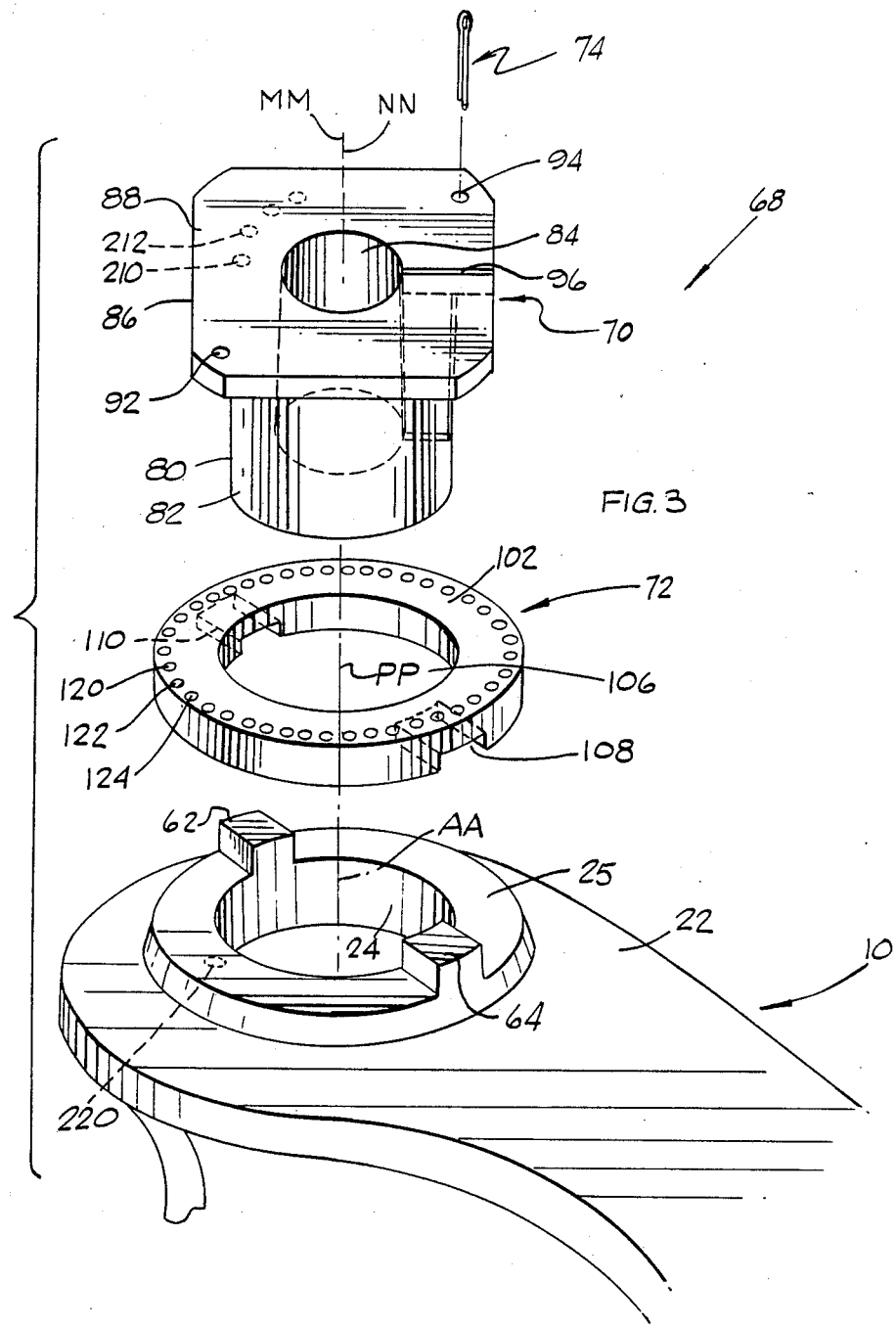
FIG. 3 is an exploded perspective view of an adjustable bushing assembly and a portion of a suspension member.

FIG. 3 illustrates an adjustable bushing assembly 68 which is adapted to be used in a steerable front wheel suspension assembly of the type illustrated in FIGS. 1 and 2. The adjustable bushing assembly 68 replaces the prior art bushing 50 and provides a plurality of positive and negative camber adjustment settings as well as a plurality of positive and negative caster adjustment settings The bushing assembly comprises a bushing member 70, an annular locking member 72, and a post member 74.

The bushing member has a cylindrical body portion 80 having a central longitudinal axis MM and a cylindrical outer surface 82. A ball joint receiving bore 84, which in one embodiment comprises a truncated cone, extends through the cylindrical body portion 80. The central longitudinal axis NN of the bore 84 is positioned in noncoaxial relationship with axis MM of the cylindrical body portion. In the illustrated embodiment, bore axis NN is positioned in skewed relationship with cylindrical axis MM, FIG. 6.

The bushing member has a radially projecting head portion 86 having a planar top surface 88 which project perpendicularly to the bore axis NN. The head portion 86 comprises a planar bottom surface 90 which extends perpendicular to the cylindrical axis MM. The bore 84 extends continuously through the bushing head portion 86 as well as the cylindrical body portion 80. A pair of small-diameter, e.g. 0.125 inch, bores 92, 94 are provided in peripheral, diametrically opposed positions on the head portion and extend parallel to the cylindrical axis MM.

The bushing member cylindrical body portion may have an outside diameter of 1.40 inches and may have an axial length of 1.08 inches. The head member may have a generally square configuration as viewed axially of the cylindrical body portion. The square head configuration may be, e.g., 2.0 inches on a side. The minimum thickness of the head portion may be 0.230 inches, and the maximum thickness may be 0.520 inches. An axially and radially extending cut 96 having a width of 1/16 inch may be provided in the bushing member 70 to facilitate press insertion of the bushing member into an associated axle housing bore 24.

The annular locking member 72 comprises a planar top surface 102 and a planar bottom surface 104. The locking member 72 has a central cylindrical bore 106 extending therethrough having a bore axis PP which is adapted to be positioned in coaxial alignment with the bushing member central longitudinal axis MM. Lug engaging channels 108, 110 which may have a width of, e.g., 0.4 inches and a depth of, e.g., 0.125 inches are provided on the bottom portion of radially and circumferentially extending surface 112 and a pair of radially and axially extending surfaces 114, 116. A plurality of evenly circumferentially spaced, axially extending holes 120, 122, 124, which may each have a diameter of, e.g., 0.125 inches and which may be circumferentially spaced 10° apart, are provided near the periphery of the annular member 72. The radial distance of each of the circumferentially spaced bores 120, 122, etc., from the central longitudinal axis PP of the annular member is the same as the radial spacing of the bores 92, 94 from the central longitudinal axis MM of the bushing member. This distance, in one preferred embodiment, is 1.125 inches. In one preferred embodiment, the diameter of the annular member 72 is 2.50 inches, and the total axial dimension of the annular member is 0.250 inches The diameter of the annular locking member central bore 106 may be 0.70 inches.

The post member 74 may comprise a conventional cotter pin.

In order to adjust camber or caster with the bushing assembly 68, the associated vehicle is suspended on a lift and a conventional wheel alignment electronic measuring device is attached to the front wheel which is to be aligned.

Next, the nut 43 of the upper ball joint 14 is removed and the existing bushing 50 is removed from the axle housing upper bore 24. Next, the annular locking member 72 is installed with the cutout portions 108, 110 thereof in engagement with the alignment lugs 62, 64. The cutouts 108, 110 are adapted to closely receive the lugs 62, 64, thus the annular member 72 is locked against rotation about central longitudinal axis PP thereof.

Next, the body portion 80 of the bushing member is inserted though the central bore 106 in the locking member 72 and is pressed into bore 24 until the lower surface of the head portion 86 engages the upper surface of the annular ring member 72. The ball joint shaft is received through the bore 84 in the bushing member as it is installed, and thus the threaded end portion of the ball joint member projects from the bushing member, as illustrated in FIGS. 6 and 7, after the bushing member is pressed into position.

Next, the bushing member is rotated, as through the use of a conventional wrench engaged with the bushing head portion, until a desired camber and/or caster position in indicated by the wheel alignment measuring device.

Next, a cotter pin 74 is inserted through at least one of the bores 92, 94 in the bushing head portion and an aligned bore in the annular locking member 72 and is fixed into position therewith. In a preferred embodiment of the invention, there is sufficient clearance, e.g. 0.25 inches, between the bottom surface of the annular locking member 72 and the upper surface 25 of the axle housing to enable conventional bending of the tip of a cotter pin received thorough member 72, as best illustrated in FIG. 6. In another embodiment (not shown) in which no such clearance is provided, the post member 74 rather than a cotter pin may comprise a tight-fitting shaft member which may be pressed through bores 94, 120, etc., or a member 74 having threads thereon which may be threadingly inserted through bores 94, 120, etc.

A plurality of bushing members 70, each having a bore which is positioned at a different inclination or offset from the central longitudinal axis of the bushing, may be provided to enable different ranges of camber and/or caster adjustment.

In another embodiment of the invention as shown in phantom in FIG. 3, the bushing member head portion is provided with a plurality of circumferentially spaced, axially extending bores 210, 212, etc., which are adapted to be selectively aligned with a small-diameter, axially extending bore 220 in the housing portion itself. The bushing may be locked into position with respect to the housing portion by a suitable post member such as 74 received through selected bushing head bore and through the housing bore.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A steerable wheel suspension assembly comprising:
   fixed axle housing means for pivotally supporting a wheel knuckle means therein;
   wheel knuckle means for supporting a wheel spindle thereon;
   first ball joint means for pivotally connecting said axle housing means with said wheel knuckle means; said ball joint means comprising a shaft portion mounted in said axle housing means and a ball housing portion mounted in said wheel knuckle means;
   bushing means having a central bushing axis and having a bushing bore extending therethrough having a central bore axis positioned in noncoaxial relationship with said central bushing axis; said bushing means being received in a bore in said axle housing means and being rotatable therein about said central bushing axis; said ball joint shaft portion being received in said bushing bore;
   bushing head means fixedly attached to said bushing means and projecting radially outwardly therefrom;
   annular plate means located between said bushing head means and said axle housing means and rotatably received about said bushing means for facilitating angular adjustment between said bushing means and said axle housing means;
   plate locking means for locking said plate means in angularly fixed relationship with said axle housing means;
   adjustable bushing locking means for locking said bushing means in a selected angular orientation with respect to said annular plate means.

2. The invention of claim 1 comprising:
   (a) first engaging means provided on said annular plate means for engaging a holding member means;
   (b) second engaging means provided on said bushing head means for engaging a holding member means;
   (c) holding member means for engaging said first engaging means and said second engaging means.

3. The invention of claim 2 wherein at least one of said first engaging means and said second engaging means comprises a plurality of circumferentially spaced holes arranged in a circle and wherein said holding member means comprises an elongate member receivable through a selected one of said circumferentially spaced holes.

4. The invention of claim 1, said annular plate means having a top portion adapted to be positioned axially adjacent said bushing head means and a bottom portion adapted to be positioned axially adjacent said yoke means, said axle housing means comprising axially and radially extending surface projections positioned radially adjacent said axle housing means bore, said plate locking means comprising radially extending recess means in said annular plate means for engaging said axially and radially extending surface projections on said axle housing means.

5. The invention of claim 3, said annular plate means having a top portion adapted to be positioned axially adjacent said bushing head means and a bottom portion adapted to be positioned axially adjacent said yoke means, said axle housing means comprising axially and radially extending surface projections positioned radially adjacent said axle housing means bore, said plate locking means comprising radially extending recess means in said annular plate means for engaging said axially and radially extending surface projections on said axle housing means.

6. An alignment adjustment bushing assembly comprising:
   a generally cylindrical body member having a first end and a second end and a central longitudinal body axis extending therebetween and having a main bore extending between said first end and said second end, said main bore having a central longitudinal axis positioned in noncoaxial relationship with said central longitudinal body axis;
   a bushing head member fixedly attached to said first end of said cylindrical body member and projecting radially outwardly therefrom, said bore in said body member extending through said head member, said head member having a planar upper surface extending perpendicular to the central longitudinal axis of said main bore, said head member comprising a planar lower surface extending perpendicular to said central longitudinal axis of said body member, said head member comprising at least one peripheral bore extending generally longitudinally therethrough;
   a plate member comprising a planar upper surface, a planar lower surface, and a central longitudinal axis extending therebetween, said plate member comprising a central bore extending between said upper and lower surfaces thereof having a bore axis positioned parallel said plate member central longitudinal axis and being adapted to receive said body member in close fitting relationship therethrough, said plate member comprising a plurality of axially extending, evenly circumferentially spaced bores positioned at a radial distance from said central longitudinal axis thereof equal to said radial distance of said head peripheral bore from said body member central longitudinal axis, said plate member comprising at least one radially extending recess portion in said lower surface thereof adapted to engage a raised rib surface on an associated structural member of a steering assembly;
   a pin member adapted to be received through said peripheral bore in said head member and a selected one of said equally circumferentially spaced bores in said plate member for holding said head member in a selected fixed angular position relative said plate member.

7. A bushing assembly for adjusting at least one wheel alignment parameter for use in a vehicle wheel suspension system of the type having a suspension member with a bore therein having a central longitudinal axis and adapted for mounting a ball-joint-shaft-receiving bushing and with at least one positioning surface located adjacent to the bore in the suspension member, comprising:
   (a) a bushing member comprising:
   a generally cylindrical body portion adapted to be inserted into the suspension member bore;

a head portion fixedly attached to one end of said body portion and extending radially outwardly therefrom and having axially extending post receiving head opening means therein for receiving a post means;

a ball-joint-shaft-receiving bore extending through said body portion and said head portion and having a central bore axis positioned in noncoaxial relationship with said cylindrical body central longitudinal axis;

(b) an annular locking member comprising:

a first end surface adapted to be positioned adjacent to said bushing member head portion and a second end surface adapted to be positioned adjacent to the suspension member;

a central bore extending therethrough adapted to receive said bushing member body portion therein;

post receiving locking member opening means selectively axially alignable with said post receiving head opening means for receiving said post means;

a positioning surface engaging means for engaging the positioning surface on the suspension member for preventing relative rotation of said annular locking member with respect to the suspension member bore;

(c) post means insertable into said post receiving head opening means and said post receiving locking member opening means for preventing relative rotation between said bushing member and said locking member.

8. The invention of claim 7, said positioning surface engaging means being located on said second end surface of said annular locking member.

9. The invention of claim 8, said positioning surface engaging means comprising surfaces defined by a radially extending channel.

10. The invention of claim 7 wherein at least one said post receiving head opening means and said post receiving locking member opening means comprises a plurality of equally circumferentially spaced openings.

11. The invention of claim 10, said equally circumferentially spaced openings comprising axially extending holes.

12. The invention of claim 11, said post means comprising a cotter pin.

13. The invention of claim 8 wherein at least one said post receiving head opening means and said post receiving locking member opening means comprises a plurality of equally circumferentially spaced openings.

14. A method of correcting a wheel alignment parameter in a vehicle wheel suspension system of the type having a first suspension member connected to a second suspension member by a ball joint and having a bore in the first suspension member adapted to receive a ball joint bushing assembly and having a positioning lug located adjacent to the bore comprising the steps of:

(a) mounting an annular locking member on the first suspension member with a recessed axial end surface thereof in locking engagement with the positioning lug;

(b) inserting a bushing member through a central opening in the locking member;

(c) inserting the bushing member into the bore in the first suspension member;

(d) inserting the shaft portion of a ball joint assembly through a bore in the bushing member;

(e) rotating the bushing member within the bore in the first suspension member until an associated wheel assembly is located in a desired wheel alignment position;

(f) axially inserting at least one pin through aligned bores in the locking member and bushing member so as to prevent relative rotation therebetween.

* * * * *

UNITED STATES PATENT AND TRADEMARK OFFICE
CERTIFICATE OF CORRECTION

PATENT NO.   : 4,921,271
DATED        : May 1, 1990
INVENTOR(S)  : Jimmy D. Berry; Robert M. Allman It is certified that error appears in the above-identified patent and that said Letters Patent is hereby corrected as shown below:

Column 5, line 31, "project" should read --projects--; and
         line 61, between "of" and "radially", insert the words --the annular locking member 72. Each channel is defined by a--.
Column 6, line 39, "in" should read --is--.

Signed and Sealed this

Eighth Day of October, 1991

Attest:

HARRY F. MANBECK, JR.

Attesting Officer

Commissioner of Patents and Trademarks